Figure 2:
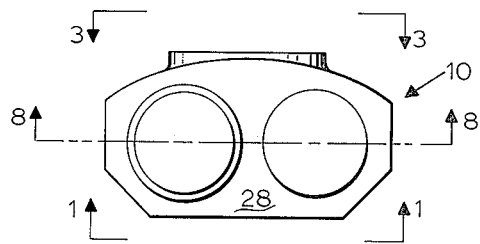

Aug. 24, 1965

S. J. GUT 3,201,939

HYDRAULIC ACTUATION APPARATUS

Filed March 19, 1964

6 Sheets-Sheet 1

STANLEY J. GUT
INVENTOR.

BY

Thomas W. Kennedy
ATTORNEY

Aug. 24, 1965  S. J. GUT  3,201,939
HYDRAULIC ACTUATION APPARATUS
Filed March 19, 1964  6 Sheets-Sheet 3

STANLEY J. GUT
*INVENTOR.*

BY

*Thomas W. Kennedy*
ATTORNEY

Aug. 24, 1965  S. J. GUT  3,201,939
HYDRAULIC ACTUATION APPARATUS
Filed March 19, 1964  6 Sheets-Sheet 4

STANLEY J. GUT
*INVENTOR.*

BY

*Thomas W. Kennedy*
ATTORNEY

STANLEY J. GUT
INVENTOR.

Aug. 24, 1965        S. J. GUT        3,201,939
HYDRAULIC ACTUATION APPARATUS
Filed March 19, 1964        6 Sheets-Sheet 6

STANLEY J. GUT
INVENTOR.

BY
Thomas W. Kennedy
ATTORNEY

United States Patent Office 3,201,939
Patented Aug. 24, 1965

3,201,939
HYDRAULIC ACTUATION APPARATUS
Stanley J. Gut, Wayne, N.J., assignor to General Precision Inc., Little Falls, N.J., a corporation of Delaware
Filed Mar. 19, 1964, Ser. No. 353,174
12 Claims. (Cl. 60—52)

This invention relates to hydraulic actuation systems, and particularly to a hydraulic actuation system having apparatus with a reciprocating differential actuator.

In a hydraulic actuation system with apparatus of the type having a reciprocating differential actuator, and having a pump, a 3-way valve and a fluid reservoir, the actuator deposits a certain amount of the fluid in the reservoir on the forward stroke and subsequently withdraws a different amount of fluid from the reservoir on the return stroke so that the reservoir fluid level rises and falls at the same speed or rate as the rate of movement or stroke of the actuator piston, which may be at a high speed in the order of 100 cycles per second.

In a present-day high-speed hydraulic system with apparatus of the aforementioned type, designed to operate in all attitudes, the reservoir fluid must also be pressurized. For this purpose, a conventional type of case-pressurizing device is used, that is, a device with a pressurizing piston, which is urged against the adjacent fluid by spring means. Such a pressurizing piston operates at the same speed as the system actuator and operates with increasing effectiveness if its piston stroke and the corresponding change in its adjacent reservoir fluid level can be minimized.

In accordance with one embodiment of the present invention, the actuator is actually submerged in the reservoir so that the actuator piston changes the reservoir volumetric capacity at the same speed that the actuator withdraws and redeposits fluid from the reservoir thereby minimizing a variation in the reservoir fluid level.

Accordingly, it is one object of the invention to minimize the fluid pressure pulsations in a pressurized reservoir in a hydraulic actuation apparatus having a reciprocating differential actuator, which withdraws and redeposits fluid from the reservoir during each piston stroke.

It is another object of the invention to provide an actuator for the aforementioned apparatus with equal power in its forward stroke and in its reverse stroke.

It is a further object of the invention to provide an apparatus with a substantially constant volumetric capacity having an actuator with variable-volume chambers and a pressurized casing with a variable-volume reservoir for a hydraulic actuation system with a substantially constant volume of working fluid.

To the fulfillment of these and other objects, the invention provides a hydraulic actuation apparatus comprising a reciprocating actuator having a cylinder and a piston, forming two variable-volume working chambers, and a pressurized reservoir unit having walls forming an expansible cavity. Passage means connect the cavity with the respective chambers. A cavity wall portion movable relative to the remaining cavity walls connects to the piston and moves simultaneously therewith for adjustably changing the cavity volumetric capacity and minimizing any change in the substantially constant total volumetric capacity of the cavity and two chambers.

Figure 6:
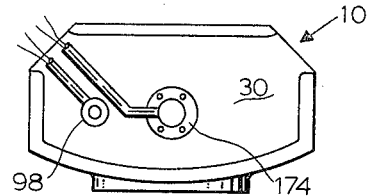
Figure 1:
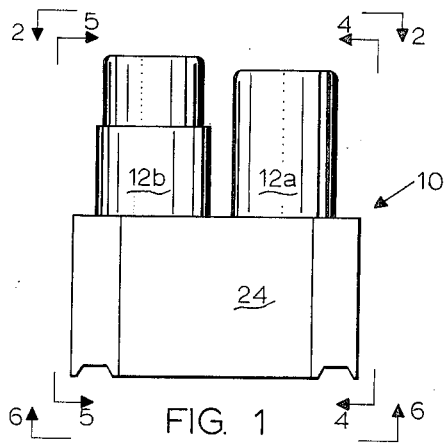
Figure 4:
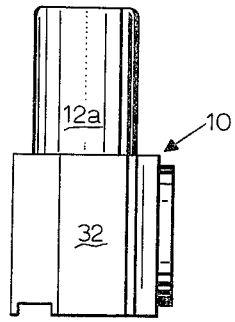
Figure 3:
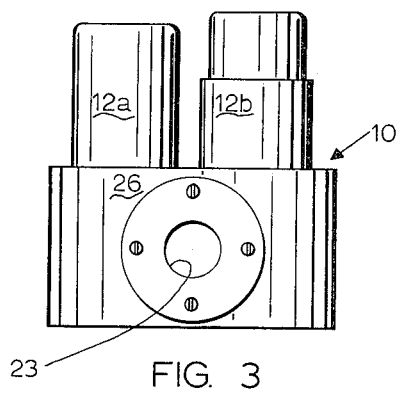
Figure 5:
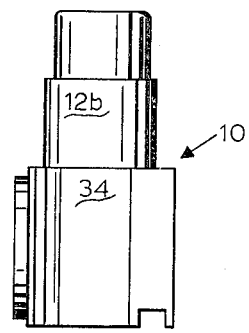
Figure 7:
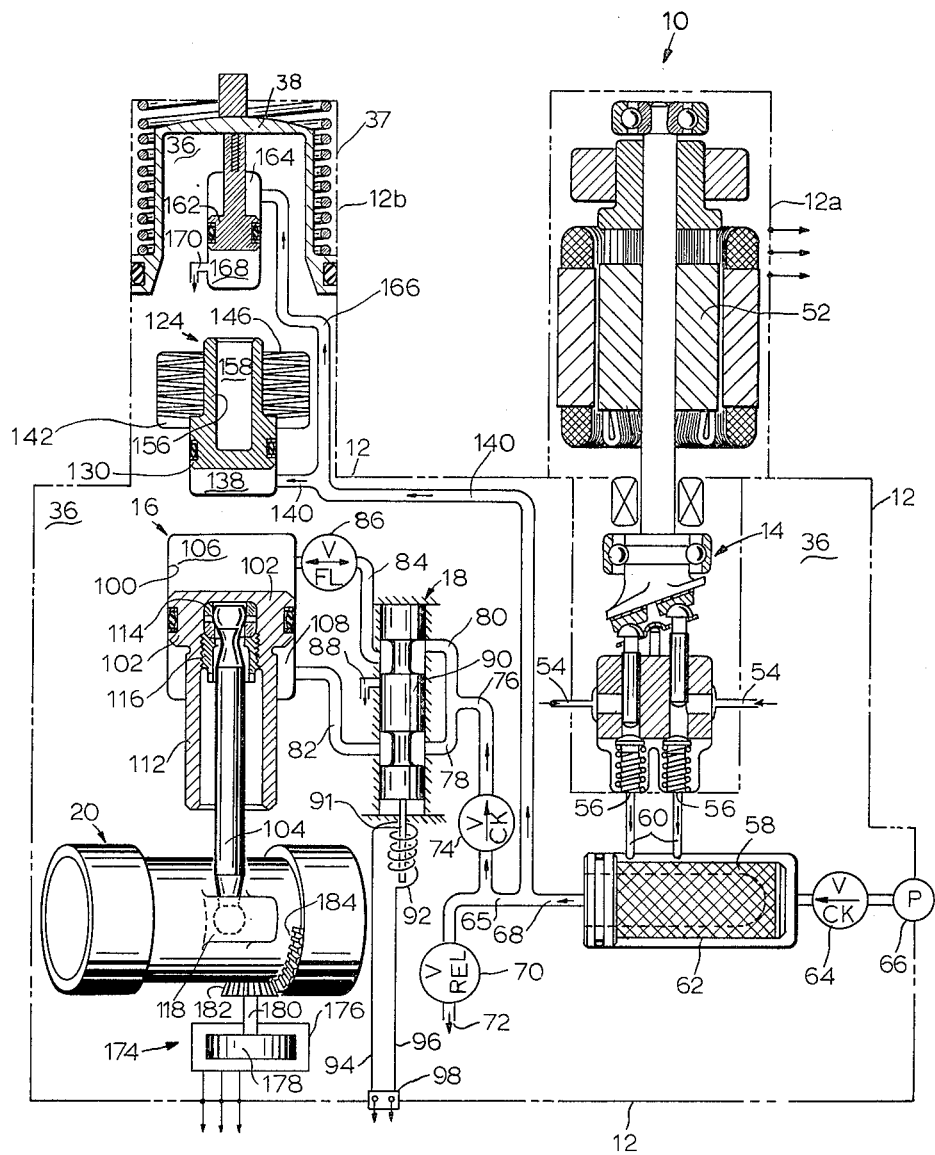
Figure 8:
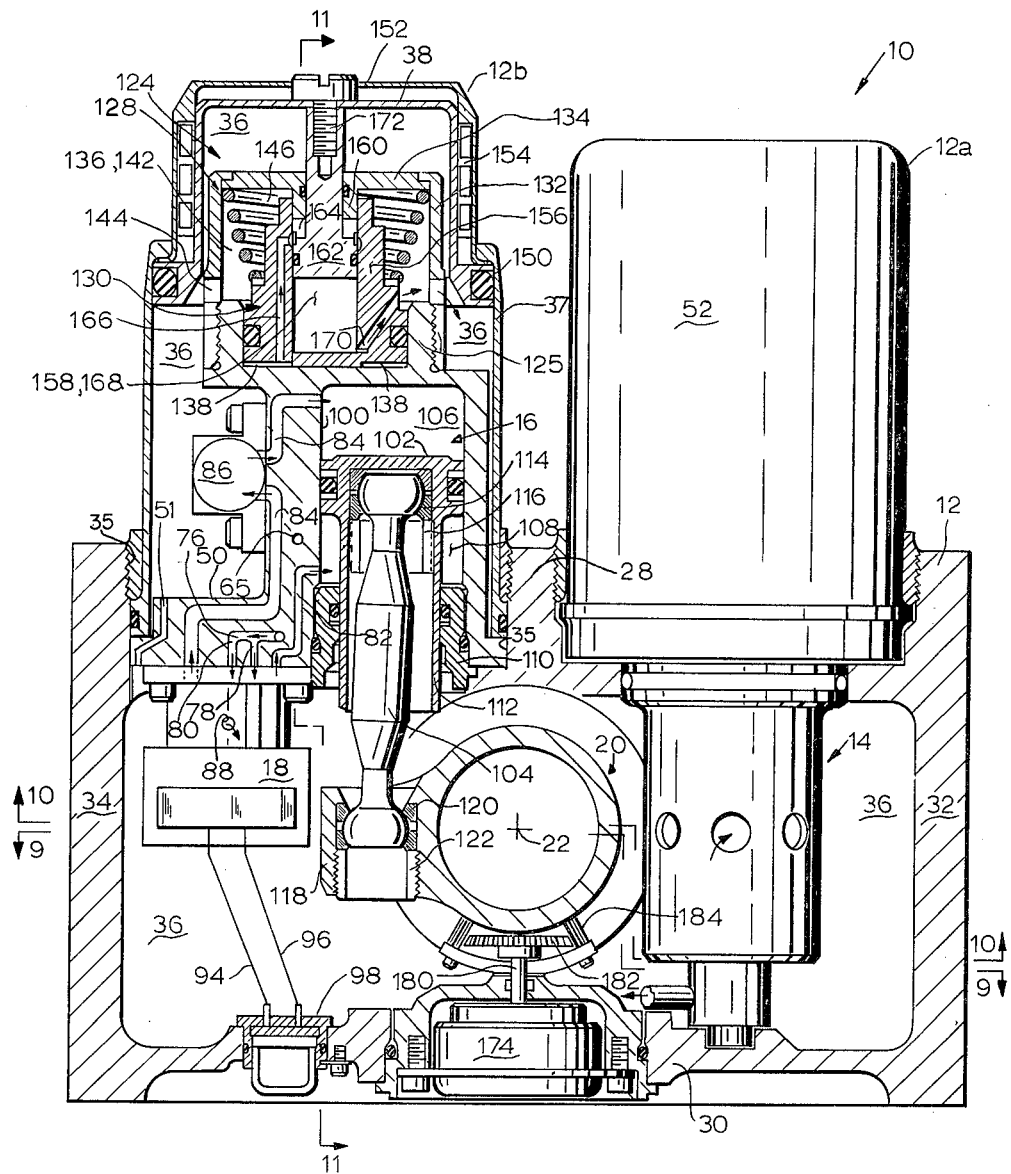
Figure 9:
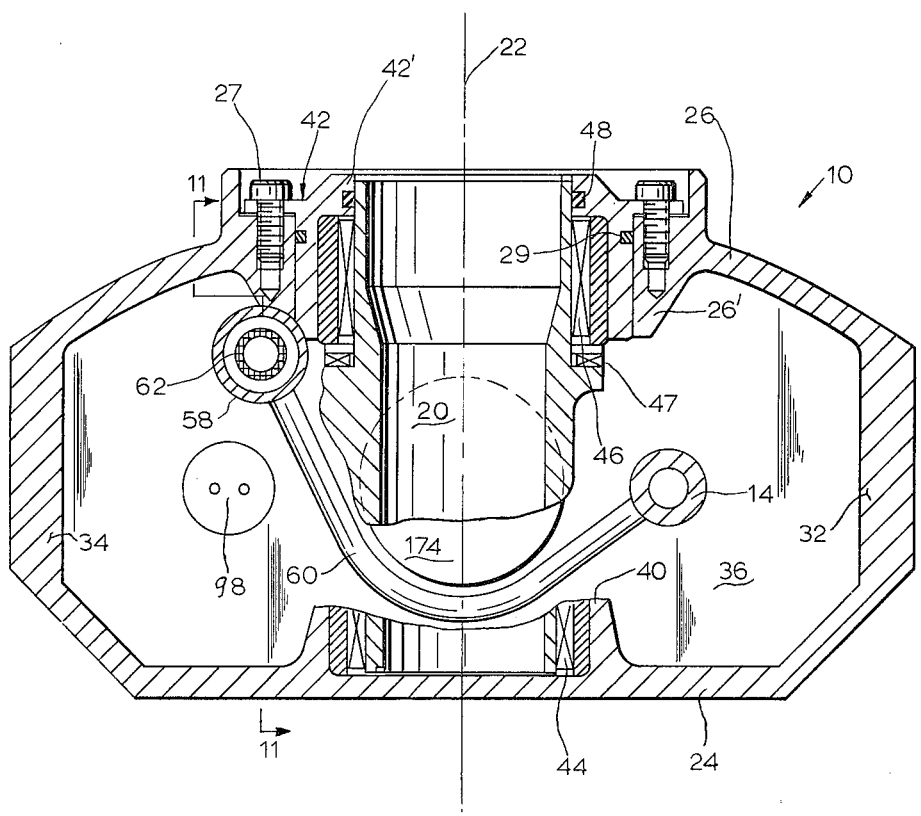
Figure 10:
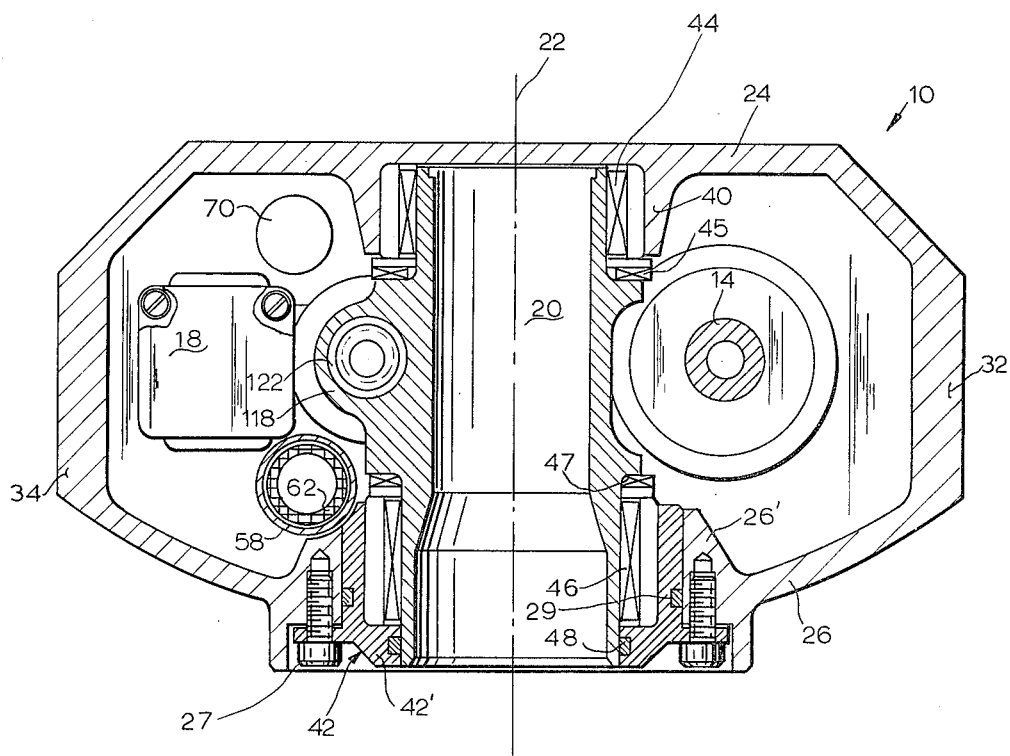
Figure 11:
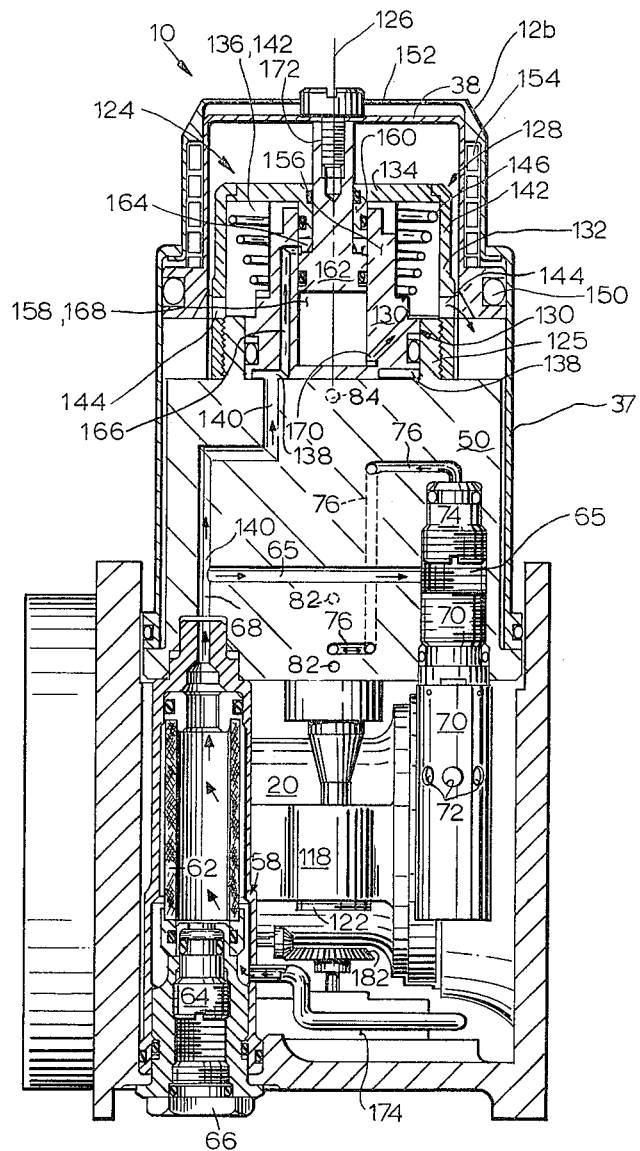

Other objects of the invention will become apparent upon reading the annnexed detail description in connection with the drawings wherein like parts are designated by like numerals throughout the several views and wherein:

FIGURE 1 is a view of the exterior of a hydraulic actuating unit embodying features of the present invention;
FIGURE 2 is a view taken on line 2—2 of FIGURE 1;
FIGURE 3 is a view taken on line 3—3 of FIGURE 2;
FIGURE 4 is a view taken on line 4—4 of FIGURE 1;
FIGURE 5 is a view taken on line 5—5 of FIGURE 1;
FIGURE 6 is a view taken on line 6—6 of FIGURE 1;
FIGURE 7 is a schematic diagram of one form of hydraulic actuating system, such as contained in the unit shown in FIGURES 1-6, embodying the present invention;
FIGURE 8 is a sectional view as taken on line 8—8 of FIGURE 2;
FIGURE 9 is a sectional view as taken on line 9—9 of FIGURE 8;
FIGURE 10 is a sectional view as taken on line 10—10 of FIGURE 8;
FIGURE 11 is a sectional view as taken on line 11—11 of FIGURE 9.

Referring to FIGURES 1 through 6 of the drawings, one embodiment of the present invention comprises a self-contained hydraulic actuating or torquing unit 10 enclosed within a housing 12 which contains working fluid. Housing 12 includes a first protruding housing section 12a, which contains part of a submerged pump (hereinafter described and designated by reference numeral 14) for pressurizing one fluid, and a second protruding housing section 12b, which contains part of a submerged actuator (also described hereinbelow and designated by reference numeral 16) that is driven by the pressurized fluid. The system is schematically shown in FIGURE 7.

As shown in FIGURE 8, unit 10 also has a flow-control servo valve means 18 which controls fluid leaving pump 14 and entering actuator 16. Unit 10 also contains an internal shaft 20 with an axis 22 accessible through aperture 23 in casing 12. Actuator 16 imparts reversible rotary movement of shaft 20 about axis 22 relative to casing 12. A work load (not shown) is preferably connected to shaft 20 coaxially therewith along axis 22. In the illustrated embodiment, actuator 16 is a differential or unequal-area type of actuator or motor and valve 18 is of the 3-way type.

As best appears in FIGURES 1-6, casing or main support 12 has front and back walls 24, 26 top and bottom walls 28, 30 and end walls 32, 34 which form a sealed reservoir cavity 36 (FIGURE 7) therebetween. In housing section 12b, top wall 28 has an opening 35, which is covered over by a closed-ended, projecting reservoir cylinder 37, that encloses and receives a case-pressurizing piston 38, which moves relative to cylinder 37 to maintain fluid pressure in cavity 36.

As shown in FIGS. 9 and 10, front wall 24 of the casing is provided with an internal annular boss 40 holding an anti-friction bearing 44 journaling one end of shaft 20. The other end of shaft 20 is journaled in an anti-friction bearing 46 mounted in a bearing retainer 42 coaxially received in an internal boss 26' on back wall 26 of the casing. Bearing retainer 42 is secured in position by suitable means such as threaded fasteners 27, and is sealed to boss 26' by means of an O-ring 29 or the like. An inwardly-extending flange 42' on bearing retainer 42 limits axial displacement of bearing 46 and, on its inner circumferential face, carries an O-ring 48 or similar packing which engages the outer surface of shaft 20, thus precluding leakage of hydraulic fluid through bearing 46. Shaft 20 also carries thrust-type bearings 45, 47 adjacent bearings 44, 46 respectively.

Top wall 28 (FIGURE 8) has a removable wall portion or a hydraulic manifold portion 50, which forms the support for actuator 16 and valve 18. Manifold 50 divides reservoir cavity 36 into an upper and lower portion and has a passage 51 therethrough connecting the separate portions of reservoir cavity 36.

Pump 14 (FIGURES 7 and 8), which is preferably a wobble-plate type of pump, has a drive means 52, which is preferably an electric motor. Motor 52 is mounted on and forms a removable portion of top wall 28. Motor 52 also supports pump 14, which is integrally connected thereto, so that pump 14 is enclosed within cavity 36 and is submerged in the cavity reservoir fluid.

Pump 14 has inlet ports 54 for receiving fluid from cavity 36, and has an outlet connection 56, which is connected to a filter 58 by a filter supply tube 60 (as illustrated in FIGURE 9), for providing fluid flow from pump 14 to filter 58, which in turn provides fluid flow to valve 18 and thence to actuator 16. Because pump 14 is submerged in the reservoir working fluid, not only is the need for sealing means minimized, but the leakage of fluid from pump 14 will enter cavity 36 thereby avoiding fluid leakage from the apparatus 10. Pump 14 preferably provides a substantially constant rate of flow and pressure head during operation. In a type of a particular model of an embodiment of apparatus 10, pump 14 raised the fluid pressure during operation from a reservoir or inlet pressure of 60 p.s.i. to a pump line or outlet pressure of 1,000 p.s.i.

Filter assembly 58 (FIGURE 11) has an upper end supported by manifold 50 and has a lower end supported by, and extending through, wall 30. Filter assembly 58 contains a screen 62 and also encloses a check valve 64 adjacent its lower end, which has a fill port 66 with a removable plug, that is sealingly threaded into valve 64 from the exterior side of bottom wall 30. Make-up fluid may be introduced through fill port 66 into cavity 36 to offset any fluid leakage from apparatus 10. Check valve 64 permits the removal of the plug in fill port 66 without outflow of pressurized fluid, the fluid being normally pressurized by the pressurizing piston 38 during both operating and shut-down conditions. In-flow of fluid from tube 60 bypasses check valve 64 and flows through filtering screen 62 in passing through filter 58.

Manifold 50 has a passage 68 which conducts outlet flow from filter 58. Manifold 50 also supports a safety relief valve 70 with an inlet (not shown) connected to passage 65, which opens when a fluid pressure exceeds a designed maximum pressure to return fluid by way of outlets 72 to the reservoir cavity 36. Manifold 50 also supports a check valve 74 connecting to passage 68 and has a passage 76 extending from the outlet of check valve 74 to the inlet of flow control valve 18.

Servo valve 18 receives an inflow from passage 76, which divides into two feed passages 78, 80 before entering valve 18. Manifold 50 has a first supply passage 82 and a second supply passage 84, both of which are connected to servo valve 18 to supply fluid flow from valve 18 to actuator 16. Passage 84 passes through a flow limiter valve 86 before entering actuator 16. Valve 18 also has a return outlet 88 emptying into reservoir cavity 36.

Servo valve 18 has an adjustable, 2-position, spool-type control member 90, which has one position for connecting feed passage 82 to a second supply passage 84 (FIGURE 7) for flow to actuator 16; and an alternate position for connecting feed passage 80 to return outlet 88, which returns fluid flow to reservoir cavity 36. A solenoid core or plunger 91, on one end of spool 90, coacts with a solenoid coil 92, energized from an outside source (not shown), by way of leads 94, 96 to shift spool member 90 from one to the other of its two positions. Leads 94, 96 have a header assembly or terminal block 98 mounted on and extending through bottom wall 30 for connection to the outside power source. Passage 78 is continuously connected to passage 82 in either position of spool 90 during the operation of the system. Servo valve 18 is mounted on the inner side of manifold 50 and is submerged in the cavity working fluid so that any valve leakage enters and is confined within cavity 36.

Actuator 16 has a cylinder 100, preferably in the form of a cylindrical recess disposed in the inner side of manifold 50; and has a piston 102 received in cylinder 100. Piston 102 has a thrust link 104, which is connected at one end to piston 102 by a universal pivot type of connection. Piston 102 forms a large-area chamber 106 and a small-area chamber 108 in cylinder 100. Cylinder 100 has a partition wall or end cap 110 separating chamber 108 from cavity 36. Piston 102 has a hollow piston rod or actuator rod 112 extending through end cap 110 and surrounding thrust link 104 to allow limited lateral movement of thrust link 104 during its reciprocating motion. Thrust link 104 is pivotly connected to piston 102 by bearing outer races 114, which are disposed between the outer surface of link 104 and the inner surface of hollow rod 112, and which are urged in bearing against link 104 by a bearing retaining nut 116. Actuator 16 is preferably submerged to simplify sealing of the actuator and to minimize leakage from the apparatus 10.

Chamber 108 and its supply passage 82 are always connected in operation by valve 18 and its supply passage 78 to pump-pressure passage 76. Thus, when chamber 106 and its supply passage 84 are connected by valve 18 to return 88 and to reservoir pressure, chamber 108 has pump pressure and chamber 106 has reservoir pressure so that piston 102 moves up (see FIGURE 7) and empties chamber 106 into reservoir 36. However, when chamber 106 and its supply passage 84 are connected by valve 18 to passages 80, 78 and 76, and to pump pressure, both chambers 108 and 106 have pump pressure so that piston 102 moves down, due to the area differential between the piston faces, and chamber 108 empties into chamber 106.

Chamber 106 preferably has twice the displacement of chamber 108. For example, a single model of actuator 16 has a piston stroke of one inch, a piston area of four square inches in chamber 106 and a piston area of two square inches in chamber 108, so that chambers 106, 108 have a displacement ratio of four cubic inch to two cubic inch or a 2 to 1 ratio. With this model actuator 16, on the upstroke, chamber 106 empties four cubic inches into reservoir 36, and chamber 108 receives two cubic inches from passage 76 and pump 14; while on the downstroke, chamber 106 receives two cubic inches from chamber 108 through passages 78 and 80 and receives two additional cubic inches from passage 76 and pump 14. Therefore, since actuator 16 preferably has this displacement ratio of 2 to 1, pump 14 normally supplies the same fluid volume on the upstroke as on the downstroke of the actuator piston 102, so that actuator 16 can operate at substantially the same speed in the forward direction as in the reverse direction, with substantially the same force.

In the model of actuator 16 in the above example, on the upstroke, two cubic inches of fluid are added to reservoir 36; and on the downstroke, two cubic inches of fluid are taken from reservoir 36. However, on the upstroke, the plunger piston 102 withdraws from the reservoir enlarging the volume of the reservoir by two cubic inches to receive the added fluid of equal volume; on the downstroke, the plunger piston 102 reduces the volume of the reservoir 36 by two cubic inches to offset the reduction in fluid volume. Thus, a rise and fall in the level of the fluid in reservoir 36 is substantially minimized. Moreover, the total volumetric capacity of the reservoir 36 and the two actuator chambers 106, 108 remains substantially constant. In addition, breathing of the reservoir 36, or variation in reservoir pressure and pump inlet pressure is substantially avoided.

Shaft 20 has an eccentric portion 118, which is pivotally connected to the free end of thrust link 104. Eccentric 118 has recessed bearing races 120 which are urged in bearing against link 104 by a bearing retaining nut 122.

Apparatus 10 has an accumulator 124 which has an axis 126. Accumulator 124 is supported on manifold 50, and is disposed in the portion of reservoir cavity 36 enclosed by cylindrical housing section 12b. Accumulator 124 has an inverted-cup-shaped housing 128 internally threaded to receive an externally threaded annular flange 125 on manifold 50. A piston 130 is fitted to the interior of flange 125 for sliding axial movement relative thereto.

The interior space 136 of housing 128 is divided by piston 130 into a sealed, pressurized, accumulator chamber 138 for fluid at pump pressure, having a passage 140 connected to passage 68, and a second or back-up chamber 142 containing fluid at reservoir pressure and having openings 144 in the peripheral wall 132 of the housing for fluid connection to the adjacent portion of reservoir cavity 36. Back-up chamber 142 has an accumulator spring means 146 compressed between housing end wall 134 and piston 130 for allowing a constant-pressure expansion of accumulator chamber 138.

Housing section 12b has an enlarged portion forming a pressurizing cylinder 37 co-axial with respect to axis 126. An inverted-cup-shaped pressurizing piston 38 is co-axially disposed with housing section 12b and has an annular flange with an O-ring in its outer peripheral surface in slidable sealing engagement with the inner surface of pressurizing cylinder 37. A coil spring 154 is compressed between plate 152 and the annular flange of piston 38 for urging the piston against the adjacent reservoir fluid to maintain a positive reservoir pressure during shut-down condition.

Accumulator piston 130 has a hollow piston rod 156 having a cylindrical cavity 158. A plug 160, integral with and projecting axially inwardly from end wall 134, is slidably received in the end of hollow rod 156 remote from piston 130. A pilot piston 162, slidably disposed within hollow rod 156, divides cavity 158 into a sealed pilot chamber 164, which receives fluid at pump pressure through a passage 166 connecting to passage 68, and chamber 168, which receives fluid at reservoir pressure through a passage 170 connecting to chamber 142 and to reservoir cavity 36.

Pilot piston 162 has a piston rod 172 extending through an opening in plug 160 and rigidly connected at its free end to pressurizing piston 38. Pilot piston 162 urges pressurizing piston 38 against the adjacent reservoir fluid to maintain a reservoir fluid pressure during operating condition, which is higher than the aforementioned reservoir pressure provided during a shut-down condition.

As shown diagrammatically in FIGURE 7, apparatus 10 also has a position read-out potentiometer 174 enclosed within a housing 176 mounted on the exterior surface of wall 30 (as appears in FIGURE 8). Potentiometer 174 includes an electrical resistance element (not shown) and a rotor wiper 178 secured to a drive shaft 180 which projects from housing 176 and extends through wall 30 into cavity 36. A bevel gear 182 fixed to shaft 180 within cavity 36 engages a coaxial, beveled ring gear segment 184 on the outer surface of shaft 20. By means of suitable conventional electrical circuitry (not shown) associated with potentiometer 174, the position of wiper 178 can be monitored and, thus, by suitable calibration, indicate the angular position of shaft 20 relative to a fixed datum.

While the present invention has been described in a preferred embodiment it will be obvious to those skilled in the art that various modifications can be made therein within the scope of the invention. For example, actuator 16 and shaft 20 of the hydraulic apparatus according to the invention can be connected by a rack and pinion in place of the thrust link and bell crank connection described. Another example of a modified hydraulic actuation system has an actuator located remotely from its reservoir, but with the reservoir having an interconnecting auxiliary cylinder and its plunger which are located adjacent the actuator. A further example of a modified hydraulic actuation system has a 4-way valve, an equal-area, dual-rod actuator with one rod submerged, and an auxiliary reservoir plunger connected to the other actuator rod by a connecting means disposed outside the reservoir. It is intended that the appended claims cover all such modifications.

What is claimed is:

1. A self-contained hydraulic actuator unit comprising a liquid-tight housing enclosing within itself a chamber sealed off from the atmosphere outside the housing and adapted to contain an operative closed loop hydraulic system filled with working fluid at a different pressure than the pressure of the outside atmosphere, the space in said chamber not occupied by components of said system defining a reservoir for working fluid forming a low-pressure portion of the system, which fluid submerges the system components, said hydraulic system also having a high-pressure portion including:

a hydraulic piston and cylinder assembly;

a pump for working fluid having low-pressure inlet passages open to said reservoir;

a multi-way, multi-port valve having low-pressure outlet passages open to said reservoir shiftable between defined positions to interconnect selected ports; and a high-pressure flow passage means operatively interconnecting said pump, valve, reservoir and hydraulic cylinder so as to cause displacement of said piston in one direction by working fluid with the valve in one of stid defined positions and in the opposite direction with the valve in the other of said defined positions; and in which said piston and cylinder assembly has a power take-off means, accessible from the exterior of said housing, disposed within said housing and coupled to said piston.

2. A self-contained hydraulic actuator unit according to claim 1, including a hydraulic pressure accumulator means in said housing for pressurizing working fluid in said reservoir, and flow passages in the low-pressure portion of the system having spring means for maintaining a minimum fluid pressure level in the reservoir and said low-pressure passages during a shutdown condition and having flow passage means connecting to the high-pressure portion of the system for increasing the pressure of the fluid in said low-pressure portion of the system above said minimum shutdown level during an operating condition.

3. A hydraulic actuation apparatus for use in all attitudes having a substantially leak-proof system containing working fluid having operating pressures substantially different from the pressures outside said apparatus comprising:

a high-speed high-pressure reciprocating actuator having a cylinder and a piston forming two variable-volume working chambers having a total volumetric capacity increasing on the forward stroke and decreasing on the back stroke; and a pressurized reservoir unit having walls forming an enclosed cavity and having means including passage means connecting the cavity with the respective chambers forming a closed-loop type of system for recirculating its working fluid, said reservoir unit walls having a reciprocating wall portion movable relative thereto forming a volume-compensating plunger for making the cavity expansible, said plunger having a solid coupling to said piston and moving simultaneously therewith for adjustably changing the cavity volumetric capacity in time with the piston for depositing fluid into said actuator on its forward stroke and withdrawing fluid from said actuator on its forward stroke and withdrawing fluid from said actuator on its back stroke and for minimizing a lag in speed between said plunger and said high-speed actuator.

4. A hydraulic actuation apparatus as claimed in claim 3 in which the actuator is a differential type of actuator with its cylinder integral with one of said reservoir walls and its piston integral with said reciprocating wall portion.

5. A hydraulic actuation apparatus as claimed in claim 3 in which the piston has end faces with a substantially 2 to 1 area ratio and has a piston rod with an end portion of substantially-constant cross-sectional area equal to one-half the area of said larger end face that is submerged in the system fluid.

6. A hydraulic actuation apparatus as claimed in claim 3 including:
pump means with an inlet communicating with the reservoir cavity and with an outlet communication with the small-area chamber; and
a three-way valve means with a first connection communicating with the large-area chamber and with a shiftable second connection communicating alternately with the small-area chamber or with the reservoir cavity, and in which said actuator, pump means and valve means are disposed in the reservoir cavity and are submerged in the working fluid disposed therein.

7. A hydraulic actuation apparatus as claimed in claim 3 and in which the reservoir unit is a hollow casing having two opposite wall portions with bearings and having a shaft journaled in said bearings; and the actuator piston connects eccentrically to said shaft to rotate said shaft relative to the casing, and has a hollow piston rod with a thrust link with frictionally-adjustable, universal-type pivots at each end thereof and is pivotally connected at one end thereof to the head of the piston, and the shaft has an eccentric portion pivotally connected to the other end thereof, each said pivot having a pair of clamp members with a pivotal core member clamped therebetween.

8. A hydraulic actuation apparatus as claimed in claim 6 and in which the reservoir unit has case-pressurizing means comprising a cylinder and a piston forming a chamber which receives spring means for pressurizing working fluid in the reservoir cavity during shut-down of the apparatus, and the cylinder has passage means connecting its chamber to the pump outlet for additionally pressurizing the working fluid in the reservoir cavity during operation of the apparatus.

9. A hydraulic actuation apparatus comprising:
a differential type of reciprocating actuator having a 2 to 1 area ratio between the two variable-volume working chambers formed by its cylinder and piston;
a hollow pressurized reservoir casing having walls forming an expansible cavity and having a pair of passages connecting the cavity with the respective actuator chambers and having two opposite wall portions with bearings and having a wall portion forming an end wall of said actuator cylinder and arranged so that said actuator piston extends through said integral wall into said cavity forming an auxiliary plunger means for adjustably changing the cavity volumetric capacity and minimizing any change in the substantially constant total volumetric capacity of the cavity and two chambers;
said piston having a hollow type of rod with a thrust link pivotally connected at one end of the head of the piston;
a shaft journaled in said wall bearings having an eccentric portion pivotally connected to the other end of the thrust link;
pump means disposed inside said cavity having an inlet communicating with the cavity and an outlet communicating with the smaller-area chamber;
a three-way valve disposed inside said cavity having a first connection communicating with the larger-area chamber and having a second connection communicating alternately with the smaller-area chamber or with the reservoir cavity;
pump passage means disposed inside said cavity connecting at one end to said pump outlet and at the other end to said smaller-area chamber;
an accumulator having an inlet connecting to said pump passage means;
a relief valve having an inlet connecting to said pump passage means and an outlet communicating with said reservoir cavity;
case-pressurizing means including a cylinder integral with the wall of said reservoir, a piston disposed in said cylinder forming a pressure chamber therebetween with an inlet communicating with said pump passage means;
a variable resistor having an outer body mounted on the casing and a co-axial inner body with a portion disposed within the cavity and connecting to a portion of said shaft to indicate the angular position of said shaft.

10. A combination drive and support device for a power takeoff comprising:
a housing having walls forming a variable-volume, fluid-tight cavity containing a pressurized fluid having a pressure higher than the atmosphere outside said housing;
power takeoff means exterior thereto and supported therefrom with a portion extending into said cavity and immersed in said fluid for movement relative thereto;
a drive means immersed in said fluid and operatively connecting to said power takeoff means for overcoming resistances to said relative movement; and
an indicating means immersed in said fluid and operatively connecting to said drive means for measuring the amount of movement of said takeoff relative to said housing; and in which
said drive means includes a two-way hydraulic actuator having a cylinder fixedly connecting to a housing wall and a piston disposed in said cylinder, and said takeoff includes a shaft having an eccentric portion; and including
a thrust link having opposite end pivot connections respectively connecting to said piston and to said eccentric portion, each said pivot connection comprising a pivotal core member integrally connected to the thrust link and a pair of bearing clamps with friction-adjusting means mounted on said connecting member.

11. A combination drive and support device for a power takeoff comprising:
a housing having walls forming a variable-volume, fluid-tight cavity containing a pressurized fluid having a pressure higher than the atmosphere outside said housing;
power takeoff means exterior thereto and supported therefrom with a portion extending into said cavity and immersed in said fluid for movement relative thereto;
a drive means immersed in said fluid and operatively connecting to said power takeoff means for overcoming resistances to said relative movement; and
an indicating means immersed in said fluid and operatively connecting to said drive means for measuring the amount of movement of said takeoff relative to said housing; and in which
said drive means includes a closed-loop hydraulic system sealed off from the atmosphere outside said housing comprising:
an actuator, pump, valve and interconnecting flow passage means immersed in said fluid and forming the high-pressure portion of said system with the actuator eccentrically connecting to said takeoff; and
second flow passage means together with the cavity forming the low-pressure portion of said system having a low-pressure passage portion interconnecting the cavity to the valve and having a separate low-pressure passage portion interconnecting the cavity to the pump.

12. A device as claimed in claim 11 in which said closed-loop system also has a relief valve means interconnecting said high-pressure flow passage means to said low-pressure flow passage means.

(References on following page)

References Cited by the Examiner

UNITED STATES PATENTS

| | | | |
|---|---|---|---|
| 1,983,900 | 12/34 | Ferris et al. | 60—52 |
| 1,993,612 | 3/35 | Lum | 60—52 X |
| 2,597,050 | 5/52 | Audemar | 60—52 X |
| 2,715,891 | 8/55 | Rodeck et al. | 60—52 |
| 2,716,966 | 9/55 | Hubert et al. | 60—52 X |
| 2,721,446 | 10/55 | Bumb | 60—51 |
| 2,751,753 | 6/56 | Ray | 60—52 |

FOREIGN PATENTS 647,428  12/50  Great Britain.

SAMUEL LEVINE, *Primary Examiner.*

EDGAR W. GEOGHEGAN, *Examiner.*